United States Patent [19]

Kubo

[11] Patent Number: 4,803,776

[45] Date of Patent: Feb. 14, 1989

[54] APPARATUS FOR LOADING REEL HUBS INTO CASSETTES

[75] Inventor: Toyohide Kubo, Tokushima, Japan

[73] Assignee: AWA Engineering Co., Ltd., Tokushima, Japan

[21] Appl. No.: 108,204

[22] Filed: Oct. 14, 1987

[30] Foreign Application Priority Data

Mar. 12, 1987 [JP] Japan .................. 62-57993

[51] Int. Cl.⁴ .............................. B23Q 7/00
[52] U.S. Cl. ...................... 29/806; 29/169.5
[58] Field of Search .......... 29/464, 430, 169.5; 53/118

[56]  References Cited

U.S. PATENT DOCUMENTS 4,225,100  9/1980  Sugawara .................. 29/806 X
4,330,925  5/1982  Kato et al. ................ 29/806 X

FOREIGN PATENT DOCUMENTS

52-49812  4/1977  Japan .................. 29/806

Primary Examiner—P. W. Echols
Assistant Examiner—Taylor J. Ross
Attorney, Agent, or Firm—Wenderoth, Lind & Ponack

[57]  ABSTRACT

An apparatus for loading reel hubs into cassette cases is provided for small cassette cases that have a sliding hub lock which interlocks with a pivoting front cover. The apparatus comprises a cassette case retainer, a front cover opening and closing device, and a reel hub holder. The front cover opening and closing device has an alignment means to align sliding hub lock catches with front cover catches insuring that the sliding hub lock is pulled forward when the front cover is opened. Reel hubs are loaded into an open cassette case with the front cover lifted and the sliding hub lock pulled away from the positions into which the hubs are loaded.

5 Claims, 6 Drawing Sheets

APPARATUS FOR LOADING REEL HUBS INTO CASSETTES

BACKGROUND OF THE INVENTION

This invention relates to apparatus for loading reel hubs into a cassette case which has its front cover opened and its sliding hub lock released.

When the tape cassette shown in FIG. 7 through FIG. 11 is in its storage state with the front cover closed (FIG. 7 and FIG. 10), the sliding hub lock 3 is engaged with the reel hubs 4 preventing hub rotation and accidental tape extraction. When the cassette is in its operational state with the front cover 2 opened (FIG. 9 and FIG. 11), the hub lock 3 is disengaged.

Figure 7:
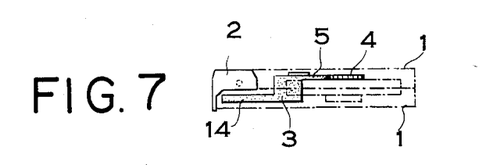
FIG. 7, FIG. 8, FIG. 9, FIG. 10, and FIG. 11 are side views and open plan views of an example of a cassette case that is loaded with reel hubs by the apparatus of this invention.
Figure 11:
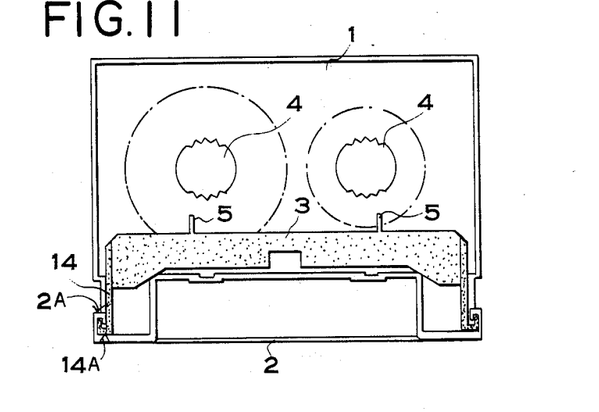

As shown in FIG. 7, when the front cover 2 is closed, the locking teeth 5 of the sliding hub lock 3 are spring biased to engage with teeth on the reel hubs 4 preventing hub rotation. Although it is not illustrated, the sliding hub lock 3 is flexibly pushed towards the reel hubs 4 by a light spring. As shown in FIG. 11, the front cover 2 and the hub lock 3 are connected by interlocking catches 14A and 2A, such that when the front cover 2 is opened, the locking teeth 5 of the hub lock 3 disengage from the reel hub 4.

Figure 8:
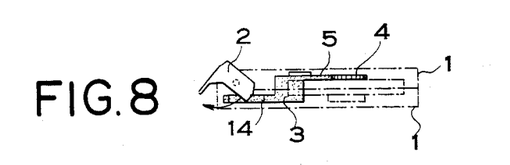
Figure 9:
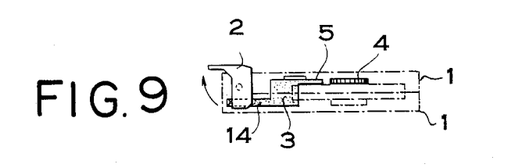
Figure 10:
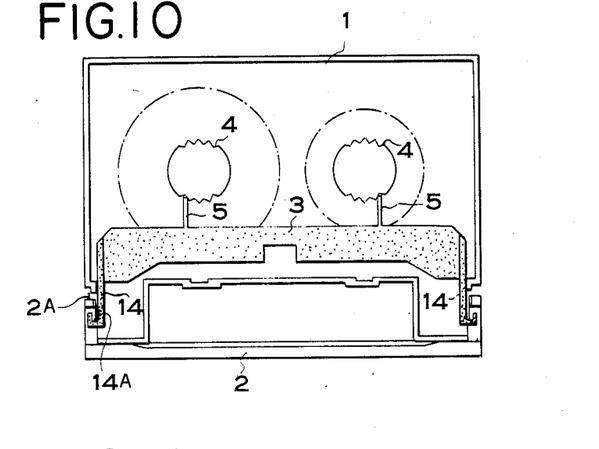

As shown in FIG. 7 and FIG. 8, The hub lock 3 has arms 14 which extend on both sides toward the front of the cassette where tape is extracted. The ends of these extension arms 14 hook outward forming the catches 14A.

The front cover 2 comprises a lid portion to conceal the front tape surface, pivot rods to allow rotation free connection to the cassette case, and catches 2A positioned outside both hub lock extension arms 14 to interlock with the hub lock arm catches 14A.

This invention is an apparatus specifically designed for loading reel hubs into a cassette case which has front cover catches located outward of the catches on the hub lock arm ends, such that when the front cover is opened the front cover catches interlock with the hub lock arm catches sliding the hub lock towards the front cover (as shown in FIG. 7 through FIG. 11). The catches may take on any of various forms which will allow the front cover to interlock with the end of the hub lock arm, and are not limited to the hook shapes shown in FIG. 10 and FIG. 11.

Former apparatus have loaded reel hubs 4 into this type of cassette case by opening the front cover thereby disengaging the hub lock, then moving either the reel hubs, the cassette case, or both, to put the hubs into the cassette. However, the hub lock 3 is disengaged by opening the front cover 2, only if the front cover catches 2A securely interlock with the hub lock catches 14A. When the cassette case is closed, hub lock and front cover movement is restrained by the cassette case, and their respective catches reliably interlock.

However, since apparatus which load reel hubs into a cassette case must perform this operation with the cassette case open, it is difficult to restrain movement of the hub lock, front cover, and catches. Consequently, in the process of automatically loading reel hubs, recurring failure of the hub lock to slide towards the front cover, when the front cover is opened, has been a problem. This is caused by failure of the front cover catches to interlock with the hub lock catches, when the front cover is opened. It is particularly important that this type of cassette be constructed as small as possible, and therefore, the formation of oversized catches to insure cover-hub lock connection is impossible.

The primary object of this invention is to provide an apparatus for reliably loading reel hubs into a cassette case which avoids the foregoing drawbacks of prior hub loading apparatus. Specifically, this invention provides an apparatus in which the catches on the ends of the hub lock extension arms reliably interlock with the catches on the front cover when the front cover is opened, thereby drastically reducing failure of the hub lock to slide towards the front cover.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

SUMMARY OF THE INVENTION

The apparatus of this invention for loading reel hubs into a cassette, comprises a cassette case retainer to hold the open cassette case, an opening and closing device to open the cassette case front cover and slide the hub lock towards the front cover, and a holder to directly or indirectly hold the reel hubs.

The opening and closing device opens the cassette case front cover. The front cover connects with the hub lock extension arms by means of interlocking catches, such that the hub lock slides toward the front cover when the front cover is opened. In this state, reel hubs are loaded into the cassette case by relative movement of the cassette case retainer and the hub holder.

The opening and closing device comprises an aligning means that exerts an outward pressure on the inside edges of the hub lock extension arms and/or push inward from outside catches on the front cover. The aligning means is constructed such that it applies outward pressure on the hub lock extension arms, and pushes the hub lock catches in a direction towards the front cover catches, or it applies inward pressure on the outside catches on the front cover, and pushes the front cover catches in a direction towards the hub lock catches.

DETAILED DESCRIPTION OF THE INVENTION

The preferred embodiment of the present invention is described based on illustrations as follows.

The reel hub loading apparatus of this invention is used for loading reel hubs 4 into a cassette case 1, either directly, or by first placing the reel hubs 4 in one part of the cassette case 1. As shown in FIG. 7 through FIG. 11, the cassette case 1 has a front cover 2 which is free to pivot open and closed to enclose the extracted tape surface. Further, when the front cover 2 is opened, the sliding hub lock 3 is correspondingly pulled towards the front of the cassette case 1.

In this type of cassette, the locking teeth 5 of the sliding hub lock 3 prevent reel hub 4 rotation when engaged with the hubs 4. Therefore, these locking teeth 5 must be moved to a position out of the path of the reel hubs 4 when the hubs 4 are loaded into the cassette 1.

Figure 1:
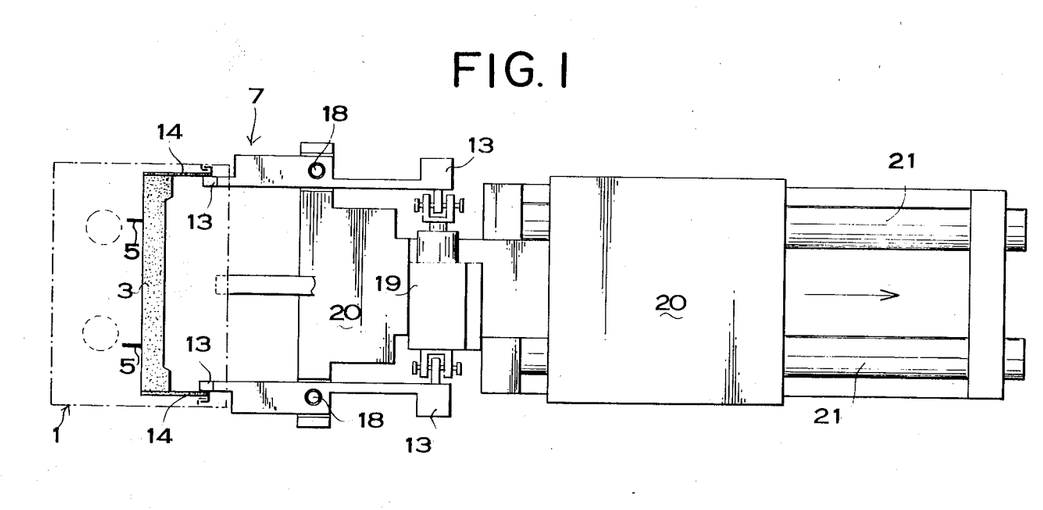
FIG. 1 is a plan view showing the alignment means of an apparatus for loading reel hubs into cassettes which constitutes a preferred embodiment of the present invention.
Figures 2, 2A, 2B:
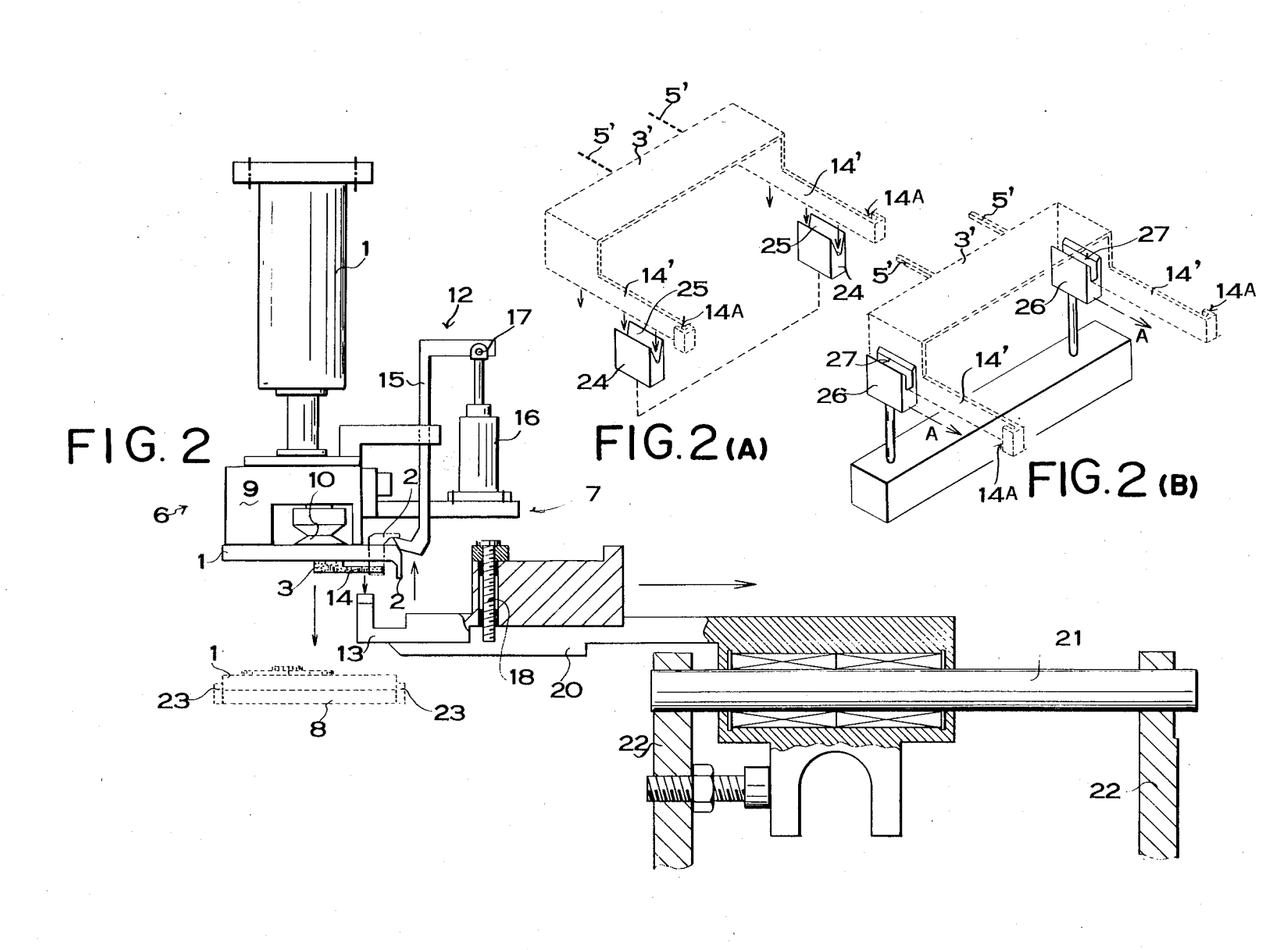
FIG. 2 is a side view, partially in cross section, showing the same apparatus as FIG. 1.
FIG. 2(A) and FIG. 2(B) are perspective views showing the major elements of the alignment means of alternate preferred embodiments of the invention.

Turning now to FIG. 1 and FIG. 2, the illustrated apparatus for loading reel hubs into a cassette case comprises a cassette case retainer 6 which picks up and holds a cassette case 1 having a front cover 2 in a face down configuration, an opening and closing device 7 which opens the front cover 2 of the retained cassette case 1 pulling the hub lock 3 towards the front of the cassette, and a reel hub holder 8 which holds the reel hubs 4 within the cassette case bottom.

The cassette case retainer 6 has a vertically moving platform 9, which is free to move up and down, and an pickup pad 10 on the bottom surface of the vertically moving platform 9. The vertically moving platform 9 is moved up and down by the actuator 11 to which it is connected. Although it is not illustrated, pickup pad 10 is connected through a pneumatic valve to a vacuum source. When the pneumatic valve is open, suction is applied through the pickup pad 10 to the upper surface of the upper part of the cassette case 1.

The opening and closing device 7 has a front cover opening member 12 to open the front cover 2 of the cassette case 1 held by the cassette case retainer 6, and alignment arms 13 to exert pressure on the inside edges of the hub lock extension arms 14.

The front cover opening member 12 is provided with an opening arm 15, and an opening actuator 16 to actuate the opening arm 15.

The upper end of the opening arm 15 is connected to the rod of the opening actuator 16 by a pin 17, and the lower end is formed in a 'J' shape to allow the opening arm 15 to hook onto the front cover 2 of the cassette case 1, held by the cassette case retainer 6, and lift that cover 2 open. The bottom end of the opening actuator 16 is mounted securely to the vertically moving platform 9.

As shown in FIG. 1, the hub lock alignment arms 13 are two parallel arms which pivot at an intermediate point about the vertical rods 18. As shown in FIG. 2, the front ends of the alignment arms 13 bend upward in an 'L' shape to allow engagement with the hub lock extension arms 14 inside the cassette case 1, and the rear ends are connected to an arm spreading actuator 19. The alignment arms 13 are connected to a horizontally moving carriage 20 through the vertical pivot rods 18 which are affixed to the carriage 20. After the ends of the alignment arms 13 have applied pressure to the inside edges of the hub lock extension arms 14, the hub lock 3 has interlocked with the catches on the front cover 2, and the front cover 2 has been opened pulling the hub lock 3 to the front of the cassette, the alignment arms 13 are withdrawn from the cassette case 1 by left to right movement indicated by the arrow of FIG. 1. Accordingly, the horizontally moving carriage 20 is slidably mounted, via sleeve bearings, on parallel slide rods 21 which are affixed to a support frame 22. The horizontally moving carriage 20 is connected to the support frame 22 through an actuator (not illustrated) which moves the horizontally moving carriage 20 along the slide rods 21.

The reel hub holder 8 which holds the reel hubs 4 within the cassette case 1 bottom comprises two vertical rotating spindles (not illustrated) which insert into the reel hubs 4 to fix their position, and cassette case retaining fingers 23 which hold the outside edges of the cassette case bottom in a fixed position.

The retaining fingers 23 can be of any construction such that a cassette case bottom, holding reel hubs 4, transferred to the retaining fingers 23 can be grasped at opposite edges, can be maintained in a fixed position, and can be opened after the upper and bottom parts of the cassette case 1 have been joined and secured to close the cassette.

It is desirable to have one or both of the vertical rotating spindles, which insert into the reel hubs 4 held in a cassette case bottom, connected to a tape slack take up motor. This take up motor can rotate one or both reel hubs to eliminate slack in the leader, magnetic, etc. tape wound on a pair of hubs prior to joining the cassette case bottom and upper parts.

Operation of the reel hub loading apparatus illustrated in FIG. 1 through FIG. 6 will now be described.

(1) The cassette case 1 upper and bottom parts are maintained in the positions shown by the solid and broken lines of FIG. 2.

(2) The actuator rod of the arm spreading actuator 19 connected to the rear ends of the alignment arms 13 extends to move the front ends of the alignment arms 13 toward each other to a width that is smaller than that between the hub lock extension arms 14.

Figures 3, 4, 5:
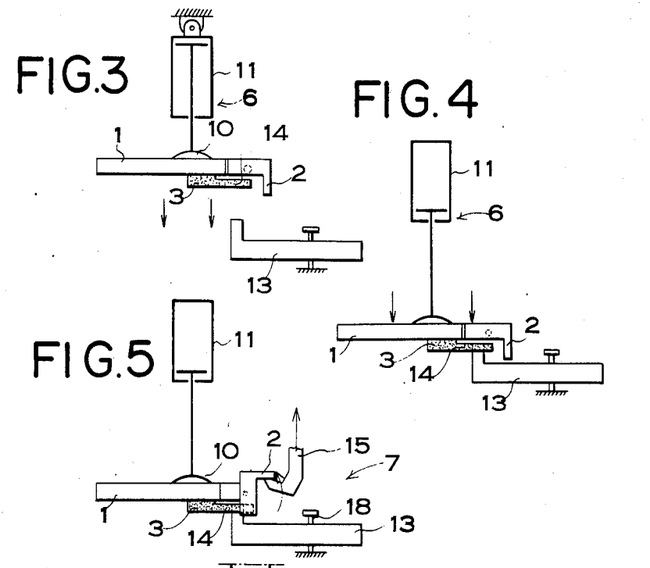
FIG. 3, FIG. 4, FIG. 5, and FIG. 6 are diagrammatic side views showing the procedural operation of a preferred embodiment of the invention loading a cassette case with reel hubs.

(3) The vertically moving platform 9 is lowered as illustrated in FIG. 3, and is stopped in a position such that the front ends of the alignment arms 13 are at the same height as the inside edges of the hub lock extension arms 14, as shown in FIG. 4.

(4) As shown in FIG. 1, the actuator rod of the arm spreading actuator 19 retracts to spread the front ends of the alignment arms 13 and apply pressure to the inside edges of the hub lock extension arms 14. The front ends of the alignment arms 13 push the hub lock extension arms 14 to a position that will positively interlock the catches 14A on the ends of the extension arms with the catches 2A on the front cover 2.

(5) As shown in FIG. 5, while the alignment arms 13 are maintained in the spread position, the opening arm 15 of the front cover opening member 12 is lifted to open the front cover 2 as well as pull the sliding hub lock 3 to the front of the cassette case. At this time the sliding hub lock 3 catches 14A are reliably interlocked with the front cover 2 catches 2A so that the hub lock 3 is pulled forward without fault.

Figure 6:
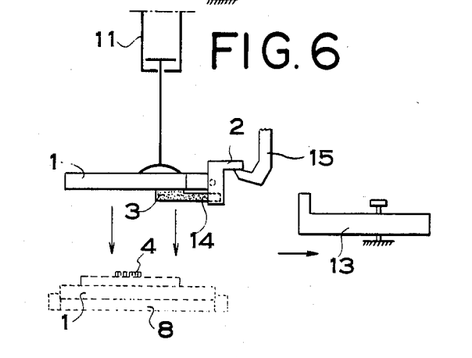

(6) The horizontally moving carriage 20 is moved in the direction shown by the arrow of FIG. 2, withdrawing the alignment arms 13 from a region within the cassette case 1, as shown in FIG. 6. At this time it is desirable to somewhat reduce the width between the front ends of the alignment arms 13 for retraction. However, retraction with the alignment arms 13 in the spread state is possible if there are obstacles on the inside edges of the hub lock extension arms 14 to catch on the alignment arms 13.

(7) The vertically moving platform 9 is lowered while maintaining the front cover 2 in the open position. The cassette case upper and bottom parts are joined thereby loading the reel hubs into the cassette case 1.

(8) Screws are inserted to hold the upper and bottom parts of the cassette case 1 together. The vertically moving platform 9 is then raised, the alignment arms 13 return to the position shown in FIG. 2, and the cassette case retainer 6 and reel hub holder 8 retain the next cassette case. The operations described in (1) through (8) are then repeated.

As described above, the reel hub loading apparatus 10 forces positive interlock of the catches 14A on the ends of the hub lock extension arms 14 with the outboard located front cover catches 2A by applying outward pressure on the extension arms 14, such that when the front cover 2 is opened, the catches 2A, 14A are reliably connected, and pivoting of the front cover 2 reliably slides the hub lock to the disengaged position. For this reason the hub lock locking teeth are positioned out of the path of the reel hubs 4 during hub loading. The feature that proper reel hub loading with minimized reel hub-locking teeth collision is thereby realized.

In the apparatus shown in FIG. 1 through FIG. 6, the reel hubs are held in the cassette case bottom part, and are loaded by joining the cassette case upper and bottom parts. However, it is obvious that the reel hubs can be grasped and loaded directly without being held by the cassette case bottom.

Further, although the inside edges of the hub lock extension arms are pushed upon by the alignment arms in this embodiment, it is also possible, for example, for a small actuator to push directly on the inside edges of the hub lock extension arms without the use of alignment arms.

Still further, the alignment means is not limited to applying pressure to only the inside edges of the hub lock extension arms 14. Namely, it is possible to fix the positions of the ends of the hub lock extension arms by grasping the extension arms applying pressure to both the inside and outside edges. In this case since the extension arms are aligned by pressure from both sides, even if the extension arms distort outside the cassette case, the catches on the arm ends can be positioned within the tracks of the catches on the front cover.

An apparatus with this type of alignment means can be realized by reconfiguring the front ends of the alignment arms. The ends of the alignment arms 24 shown in FIG. 2(A) are provided with 'V' shaped grooves 25 to accommodate the hub lock extension arms 14. The 'V' shaped grooves 25 are disposed parallel to, and directly below the hub lock extension arms 14. The open ends of the 'V' shaped grooves 25 are wider than the thickness of the extension arms 14, while the bottom of the grooves are equal to, or slightly narrower than the thickness of the extension arms 14. This configuration allows the extension arms 14 to be guided into the 'V' shaped grooves 25 for alignment.

With these alignment arms 24, the hub lock 3 extension arms 14 are inserted within the 'V' shaped grooves 25 and held in fixed positions by pressure from both sides of the grooves. The positions at which the extension arms 14 are held by the 'V' shaped grooves 25 are such that the catches on the ends of the extension arms 14 align with the tracks described by movement of the catches on the front cover when that cover is opened.

Since the extension arms 14 are put into position by insertion into the alignment arms 24, there is no need to spread the alignment arms as illustrated in FIG. 2 (alignment arms 13).

After the extension arms 14 have been positioned, the extension arm catches have been interlocked with the front cover catches, and the hub lock has been pulled forward, the ends of the arms 14 with the 'V' shaped grooves are lowered and withdrawn out of the path of the reel hubs 4 into the cassette case.

Clearly, it is not always necessary for the parts of the alignment arms which position the extension arm 14 catches (the front ends of the alignment arms 13 in FIG. 2) to move outward from the inside edges of the extension arms 14. For example, positioning of the extension arm 14 can be accomplished by 'V' shaped grooves 25 as shown in FIG. 2(A), or as shown in FIG. 2(B), by a configuration which puts the extension arm 14 catches in fixed positions by moving alignment members 26, from positions at the locking end of the hub lock 3, towards the ends of the extension arms 14.

The alignment members 26 shown in FIG. 2(B) have alignment grooves 27 for guiding the extension arms 14. These alignment grooves 27 are formed parallel to, and with a width approximately equal to that of the extension arms 14. The alignment grooves 27 guide the extension arms 14 and maintain them in fixed positions. As shown in FIG. 2(B), the bases of the hub lock 3 extension arms 14 are inserted into the alignment grooves 27 of the alignment members 26, the alignment members 26 are moved from these positions along the extension arm 14 as indicated by the arrow A towards the ends of the extension arms 14, and the extension arm catches 14A are thus maintained in a fixed position. Movement of the alignment members 26 along the extension arms 14 corrects arm distortions by applying pressure to the inside or outside edges of the extension arms 14 thereby putting the extension arm catches 14A into fixed positions.

The hub lock 3 is almost without exception formed as single piece with synthetic resins (plastic). Since the hub lock extension arms 14 are thin and narrow, arm distortion is not uncommon, and the catches 14A on the ends of the extension arms 14 are sometimes out of position with respect to the catches on the pivoting front cover 2. However, since the bases of the extension arms 14 (locking end of the hub lock 3) are wide, there is almost no distortion, and as shown in FIG. 2(B), the alignment grooves 27 of the alignment members 26 can be guided onto the bases of the hub lock extension arms 14 without failure. The alignment members 26 maintain the extension arm catches 14A in fixed positions by holding the extension arms 14 at points slightly away from the catches to avoid interference with the pivoting motion of the front cover 2.

After the extension arm catches 14A have interlocked with the front cover catches 2A and the front cover has been opened, the alignment members 26 are withdrawn from the extension arms 14 to a standby position out of the way of the cassette case, then as shown in FIG. 2, the cassette case upper part held by the cassette case retainer with the front cover in the open position is joined with the cassette case bottom part to load the reel hubs.

Figures 2C, 2D:
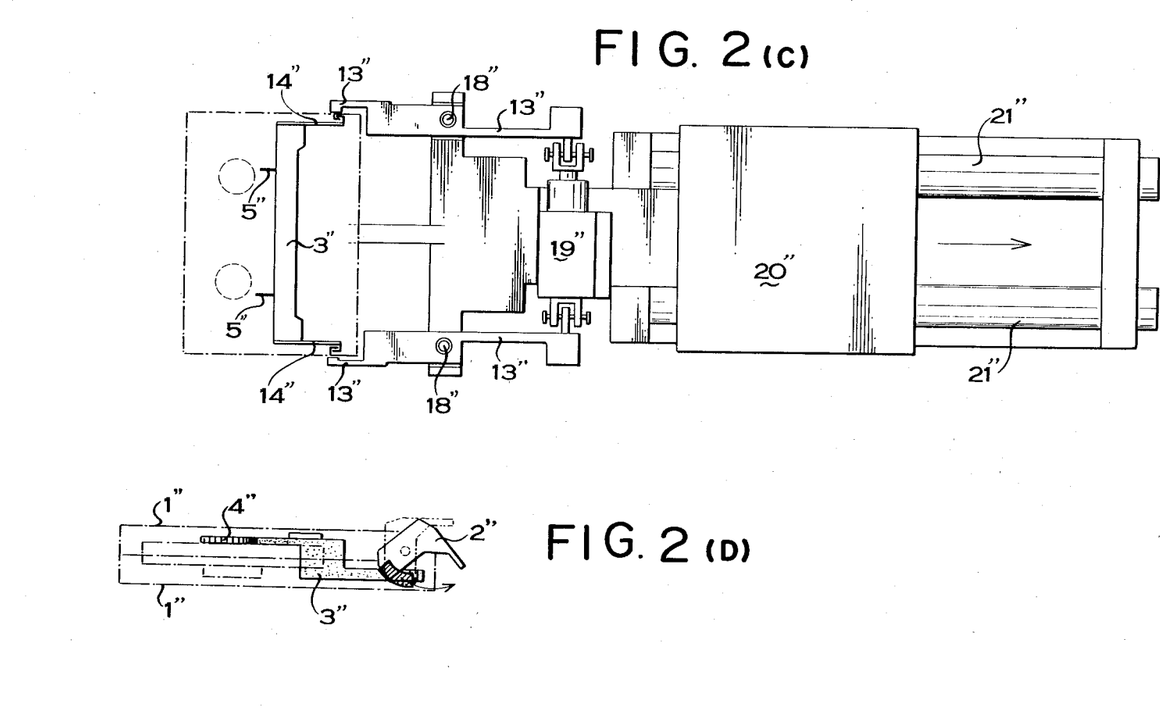

Further turning to FIG. 2(C), alignment arms 13″ which push inward from outside the front cover catches are depicted. These alignment arms 13″ are actuated by the same mechanism as the alignment arms 13 shown in FIG. 1 such that the front ends of the alignment arms 13″ push on the outside edges of the front cover catches to reliably guide those catches into alignment with the catches on the ends of the extension arms 14″. Specifically as shown in FIG. 2(D), the alignment arms 13" apply pressure to the oblique line hatched portion of the front cover 2" to insure interlocking of the front cover catches with the catches on the ends of the extension arms 14" during front cover opening. Since the alignment arms 13" apply inward pressure from the outside edges of the front cover 2", opposite that of the alignment arms 13 of FIG. 1, the rod of the actuator 19" connected to the rear ends of the alignment arms 13" extends during front cover 2" opening. In FIG. 2(C) and FIG. 2(D), 1" is the cassette case, 3" is the hub lock, 4" are the reel hubs, 5" are the locking teeth, 18" are the vertical pivot rods on which the alignment arms are rotatably mounted, and 20" is the horizontally moving carriage.

What is claimed is:

1. An apparatus for loading reel hubs into cassettes which have an openable and closable front cover and a sliding hub lock with hub lock extension arms with catches thereon interlockable with outside catches on the front cover, said apparatus comprising:

a cassette case retainer for holding an open cassette case;

an opening and closing device movable toward and away from said cassette case retainer for opening the cassette front cover and pulling the sliding hub lock forward; and a reel hub holder movable toward and away from said cassette case retainer for loading reel hubs into a cassette case;

said front cover opening and closing device having an alignment means for engaging the sliding hub lock extension arms for aligning the catches on the ends of said sliding hub lock extension arms with the loci described by the outside catches on the front cover as the front cover opens, whereby when said opening and closing device opens the front cover, the sliding hub lock extension arm catches are aligned with the front cover outside catches by said alignment means.

2. An apparatus as claimed in claim 1, in which said alignment means comprises alignment arms.

3. An apparatus as claimed in claim 2, in which said alignment arms are provided with V-shaped grooves for holding the opposite sides of the sliding hub lock extension arms for fixing the positions of the catches on the ends of the extension arms.

4. An apparatus as claimed in claim 1, in which said alignment means comprises alignment members having alignment grooves in which said extension arms are receivable, said alignment members being movable along said extension arms toward the ends of the extension arms on which the catches are provided.

5. An apparatus for loading reel hubs into cassettes which have an openable and closable front cover and a sliding hub lock with hub lock extension arms with catches thereon interlockable with outside catches on the front cover, said apparatus comprising:

a cassette case retainer for holding an open cassette case;

an opening and closing device movable toward and away from said cassette case retainer for opening the cassette front cover and pulling the sliding hub lock forward; and a reel hub holder movable toward and away from said cassette case retainer for loading reel hubs into a cassette case;

said front cover opening and closing device having an alignment means for engaging the outside catches on the front cover for aligning the loci described by the outside catches on the front cover as the front cover opens with the catches on the sliding hub lock extension arms, whereby when said opening and closing device opens the front cover, the sliding hub lock extension arm catches are aligned with the front cover outside catches by said alignment means.

* * * * *